(12) United States Patent
Walsh

(10) Patent No.: US 7,798,720 B1
(45) Date of Patent: *Sep. 21, 2010

(54) SQUEEZE FILM DAMPER WITH HIGHLY VARIABLE SUPPORT STIFFNESS

(75) Inventor: William S. Walsh, Port St. Lucie, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 684 days.

This patent is subject to a terminal disclaimer.

(21) Appl. No.: 11/600,453

(22) Filed: Nov. 16, 2006

(51) Int. Cl.
*F16C 27/00* (2006.01)
(52) U.S. Cl. ............................................. 384/99
(58) Field of Classification Search ............... 384/99, 384/581
See application file for complete search history.

(56) References Cited

U.S. PATENT DOCUMENTS

| | | | |
|---|---|---|---|
| 3,415,470 A * | 12/1968 | Woodford et al. ........... 267/137 |
| 4,392,751 A | 7/1983 | Ida et al. |
| 4,422,779 A | 12/1983 | Hamaekers et al. |
| 4,457,667 A | 7/1984 | Seibert et al. |
| 4,527,912 A | 7/1985 | Klusman |
| 4,652,148 A | 3/1987 | Olasz |
| 4,669,893 A | 6/1987 | Chalaire et al. |
| 4,705,410 A | 11/1987 | von Broock |
| 4,749,282 A | 6/1988 | Spargo et al. |
| 4,992,024 A | 2/1991 | Heydrich |
| 5,071,262 A | 12/1991 | Monzel et al. |
| 5,076,755 A | 12/1991 | Okada |
| 5,080,499 A | 1/1992 | Klusman et al. |
| 5,085,521 A | 2/1992 | Singh |
| 5,178,400 A | 1/1993 | Singh |
| 5,197,807 A | 3/1993 | Kuznar |
| 5,344,239 A * | 9/1994 | Stallone et al. ............... 384/99 |
| 5,380,100 A * | 1/1995 | Yu ............................. 384/99 |
| 5,421,655 A | 6/1995 | Ide et al. |
| 5,531,522 A | 7/1996 | Ide et al. |
| 5,603,574 A | 2/1997 | Ide et al. |
| 5,651,616 A * | 7/1997 | Hustak et al. ................ 384/99 |
| 6,883,967 B2 * | 4/2005 | Robb et al. .................. 384/536 |

FOREIGN PATENT DOCUMENTS

| | | | |
|---|---|---|---|
| EP | 1167788 A1 * | 1/2002 |
| EP | 1170520 A2 * | 1/2002 |
| JP | 06300037 A * | 10/1994 |
| JP | 09112549 A * | 5/1997 |
| JP | 11-62953 A * | 3/1999 |
| JP | 2000145768 A * | 5/2000 |
| JP | 2003088013 A * | 3/2003 |

* cited by examiner

*Primary Examiner*—Marcus Charles
(74) *Attorney, Agent, or Firm*—John Ryznic

(57) ABSTRACT

A squeeze film damper assembly having a variable stiffness and damping control. The squeeze film damper includes a damper chamber formed by two flexible bellows chambers of the sides. A first pressure source is applied to the damper chamber to regulate the damping. A second pressure source is applied to the flexible bellows chambers to vary the stiffness of the damper. The flexible bellows chambers are secured between an outer member and an inner member of the damper assembly and form the sealed damper chamber. A pressure ratio between the bellows chambers and the damper chamber can vary to control the stiffness of the squeeze film damper.

17 Claims, 1 Drawing Sheet

SQUEEZE FILM DAMPER WITH HIGHLY VARIABLE SUPPORT STIFFNESS

CROSS-REFERENCE TO RELATED APPLICATIONS

This application is related to US Regular utility patent application Ser. No. 11/524,018 filed on Sep. 20, 2006 and entitled SQUEEZE FILM DAMPER WITH VARIABLE SUPPORT STIFFNESS, now U.S. Pat. No. 7,517,152 B1 issued on Apr. 14, 2009.

BACKGROUND OF THE INVENTION

1. Field of the Invention

The present invention relates generally to bearings, and more specifically to a squeeze film damper for a bearing in which the damper has variable damping.

2. Description of the Related Art Including Information Disclosed Under 37 CFR 1.97 and 1.98

A turbomachine, such as a turbopump, utilizes damper seals and rigidly mounted rolling element bearings to dampen and rotatably support the shaft. Prior Art turbo pumps use an interstage bearing and damper seals to provide support and damping to the rotor. Damper seals provide positive stiffness but require leakage flow to operate. Squeeze film dampers (SFD) are inherently stable and do not produce and destabilizing forces. One problem with Prior Art squeeze film dampers is that they have no stiffness and therefore cannot support the rotor. The Prior Art configurations require a centering spring so that the squeeze film damper does not bottom out on one side or whirl about the outer diameter. This centering spring controls the overall support stiffness until the squeeze film damper has bottomed out on the housing. When the squeeze film damper and centering spring have bottomed out, the support has minimal damping and a very high stiffness from the housing. Some prior art squeeze film dampers also have air entrainment or cavitations. This air entrainment or cavitations limit the performance of the squeeze film damper. It is this combination of high and low stiffness with variable damping that make it difficult to predict the performance of the squeeze film damper.

Rolling element bearings have been used on many prior art turbopump designs. Their reliability and consistency during startup is important for many applications from main engines to upper stage engines that need the ability to have multiple start and stop cycles. Rolling element bearings are also important for turbo pumps that are designed to have long time periods between overhauls because of their consistency and predictable wear. Rolling element bearings are also excellent for deep throttling since they do not rely on hydrostatic pressure to support the rotor. It is for these reasons and many others that future turbo machines will continue to use rolling element bearings as the primary rotor support.

One weakness of rolling element bearings is the lack of damping they provide to the rotor. A system without adequate damping will transmit high forces through the bearings causing premature failure of the bearings and other high cycle fatigue (HCF) limited components. In most cases, the HCF can be mitigated by a change in design, usually causing the system mass and complexity to increase. In addition, a lightly damped rotor can exhibit large amplitude vibration and rotor dynamic instability. Rotor dynamic instability causes extreme forces in the rotor and casing and can limit component life or in extreme cases can be destructive. Therefore, most Prior Art turbo pumps use an interstage seal called a damper seal that is configured to minimize leakage and provide damping to the system. Unfortunately, a damper seal requires a minimum pressure and flow rate to be effective, therefore putting a lower limit on the pressure and mass flow through the secondary flow circuit. Any leakage through the secondary flow system causes a large performance penalty for a turbopump, so having a minimum allowable flow rate through the turbopump is not ideal. Another drawback of a damper seal is that while it does provide good damping characteristics, it also produces a cross-coupled stiffness which is a destabilizing force. The Prior Art damper seal has proven successful, however many drawbacks exist that provide limitations not only to the bearings, but also to the entire turbomachine.

One prior art patent, U.S. Pat. No. 5,603,574 issued to Ide et al on Feb. 18, 1997 and entitled FLUID DAMPENED SUPPORT HAVING VARIABLE STIFNESS AND DAMPING shows a fluid dampened bearing with a flexible fluid dampened membrane that is used to support the bearing, and an incompressible fluid is provided in the spaces to allow fluid dampening. However, the fluid damper of the Ide et al invention does not change the stiffness of the damper as in the present invention.

U.S. Pat. No. 5,080,499 issued to Klusman et al on Hanuary 14, 1992 entitled HIGH TEMPERATURE SQUEEZE FILM DAMPER shows a squeeze film damper with a pair of metal bellows straddling annular exposed channels, the metal bellows being welded to the fixed and floating journals, in which the bellows confines the damping fluid. The bellows in the Klusman invention is not pressurized by a pressure source from outside the bellows, and the pressure acting within the bellows cannot be varied or regulated in order to control the stiffness of the squeeze film damper as in the present invention. The bellows in the Klusman invention act more like a reservoir for the damping fluid in the squeeze film damper. The bellows of the applicant's invention is more than a reservoir.

In this applicant's previously filed and co-pending application to the Squeeze Film Damper with Variable Support Stiffness, the flexible bellows was formed to flex outward from the center to produce the variable stiffness for the damper. Since the previous application was filed, the applicant has discovered through modeling that forming the flexible bellows in the reverse sense in that the bellows flexes inward instead of outward, the stiffness of the damper can vary significantly more than the outwardly flexing bellows damper. The inward flexing bellows can vary stiffness up to about 300% to 400% from the base stiffness of the damper. The base stiffness is the flexible bellows of the present invention without any pressure applied to either chamber 33 or 42.

It is an object of the present invention to provide for a squeeze film damper for a rolling element bearing that will provide a variable spring force to center and support the bearing and squeeze film damper independent of the operating speed.

Another object of the present invention is to provide for a squeeze film damper for a rolling element bearing in which the squeeze film damper fluid is separated from the secondary fluid flow circuit.

Still another object of the present invention is to provide for a squeeze film damper for a rolling element bearing that requires less axial length than the prior art damper seal and roller element bearing.

Yet still another object of the present invention is to provide for a squeeze film damper for a rolling element bearing in which the spring rate of the damper can be changed rapidly and accurately.

These and other objects of the present invention will become apparent with the description of the present invention below.

BRIEF SUMMARY OF THE INVENTION

The present invention is a squeeze film damper located directly over the rolling element bearing, in which the squeeze film damper is formed of two annuli of fluid contained by a metal bellows located on either side of the squeeze film damper. The bellows forms an inner chamber that contains the damping fluid for the squeeze film damper, and an outer chamber in which the fluid pressure is regulated to control the pressure in the squeeze film damper chamber. A first and a second pressure source is used to regulate the pressures in both of these chambers to control the damping and stiffness independently. The pressurized metal bellows flexes inwardly to provide for a variable spring force to center the bearing independent of the operating speed, provides for the separation of the damper fluid and the secondary fluids with zero leakage, requires less axial length leading to significant weight reduction and reducing the overall length and distance between bearings in order that the bending mode natural frequency is higher, and reduces the overall size and weight of the turbomachine. The squeeze film damper will not allow air entrainment because it will have fluid reservoirs on either side of the squeeze film damper. The squeeze film damper can be pressurized with the working fluid or an alternative fluid separated from the working fluid. The flexible bellow having the inward flexibility provides a higher variability in stiffness than the previous invention by this applicant while also providing for zero leakage.

By controlling the pressure in the bellows, the spring rate of the support system can be changed rapidly and accurately. This variable spring rate can be leveraged to manipulate rigid body critical speeds. The capability to move critical speeds is very important for several reasons. First, by moving the critical speeds around, the modes can be avoided all together during startup. For instance, during startup, the bellows are pressurized to the highest pressure possible. By having the pressure high in the bellows, the spring rate is at its maximum, and therefore the rigid body modes are also at their highest speed. When the first rigid body is approached, the pressure in the bellows is suddenly reduced and therefore the spring rate is drastically reduced. By both accelerating and rapidly reducing the spring rate, the passage through the critical speed is traversed extremely quickly. By limiting the time at the critical speed, any rotor response from the critical speed will be minimal. Another benefit to moving around the critical speeds is the ability to operate anywhere on the rpm scale to obtain extremely deep throttling capability. By either increasing or decreasing the stiffness at a given rpm, a critical speed can be moved so that operation at that speed is possible. This allows any rigid body vibration mode to be relocated so that peak performance can be obtained and startup profiles are independent of rigid body vibration modes.

The proposed configuration allows the pressurized bellows to provide a positive direct stiffness in series with the bearing. By directing the load through the bearing and then through the pressurized bellows and squeeze film damper in series instead of in parallel like most turbo-pumps, some of the load-carrying requirement is removed from the bearing, enhancing life. Since the pressurized bellows stiffness will be highly controllable and typically lower than the bearing stiffness, the fluid film will respond to dynamic loads thereby decreasing the dynamic load on the bearing. The squeeze film damper will dissipate and dampen the vibrations that would normally be transmitted directly to the housing. The reduction of dynamic loads to the housing will increase the life of any HCF limited turbopump component. Another benefit of the positive load capacity of the pressurized bellows is that the bearing will no longer have to run with a dead band clearance. Traditionally it is very difficult to predict the true bearing stiffness when a dead-band clearance is used. The elimination of this clearance linearizes the performance and characteristics of the rolling element bearing and makes its behavior easier to predict.

The new configuration allows the stiffness to be varied significantly more than the previous configuration. The stiffness can vary by a minimum of 300% or more, allowing the rigid body modes to be moved around to any desired speed. The new configuration also lends itself to more applications.

This invention could be used as a retrofit or add-on for external bearing races, where the inner diameter is the actual outer bearing race and the outer diameter is the housing. Also, this invention could be used in test rigs or laboratory environment for fine control of lateral stiffness for experimentation. This device could be used in balance machines to determine the unbalance of a system at various stiffness values. This device could be used to highly calibrate rotor-dynamic models by providing a well known stiffness value to a complex rotor to determine the dependence of critical speeds on bearing stiffness. This present invention design could be used as a fix for poorly operating rotors where hydraulic pressure is easily accessible and variable or lower rotor stiffness or bearing stiffness is required. This device could be operated as a force feedback measurement tool by measuring the deflection and the supplied pressure, the resultant forces (and unbalance) could be determined.

DETAILED DESCRIPTION OF THE INVENTION

Figure 1:
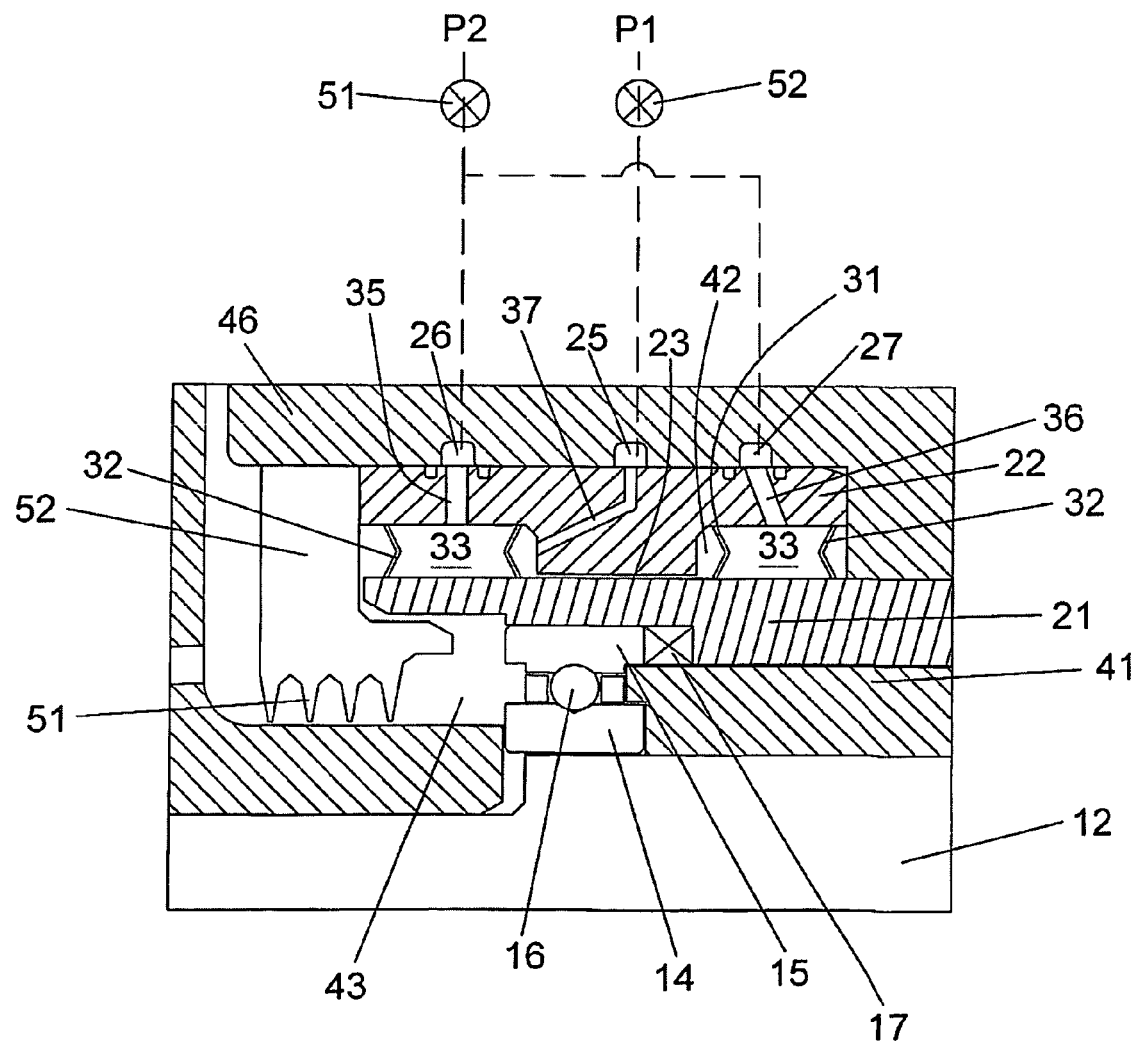
FIG. 1 shows a cross section view of the squeeze film damper and bearing of the present invention.

The squeeze film damper with variable stiffness support of the present invention is shown in FIG. 1. A rotor shaft 12 for a turbomachine is supported by a roller element bearing having an inner race 14, and outer race 15, and a roller element such as a ball 16 between the races. A labyrinth seal 51 extends from a support 52 secured to a stationary housing or casing 26 of the turbomachine to form a seal on the side of the bearing. A squeeze film damper is inner member 21 and an outer member 22 in which a squeeze film damper chamber 23 is formed between adjacent surfaces of the two members. The outer member 22 is supported by the casing 26, and the inner member 21 supports the outer race 15 of the bearing.

An annular bellows assembly is positioned between surfaces on the outer member 22 and the inner member 21. The bellows assembly includes an inner bellows 31 and an outer bellows 32 that define a bellows chamber 33. The top ends of the inner and the outer bellows 31 and 32 are secured to the surface of the outer member 22 and the bottom ends are secured to the surface of the inner member 21 to form the sealed bellows chamber 33. The flexible bellows 31 and 32 both flex inward toward the closed chamber 33 formed between the flexible bellow members 31 and 32. The bellows includes an upper part joined to the outer member 22 and an inner part joined to the inner member 21, and in which the joint between the two parts is flexible or bendable under the pressure difference between chamber 33 and chamber 42.

The bellows 31 and 32 is formed from a material that will withstand the temperature environment of the bearing, providing for the bellows 31 and 32 to flex inward toward the chamber 33 instead of outward as in the previous invention by this applicant will allow for a higher variable stiffness of from 300% to 400% that the flexible bellows (without any pressure applied to the chamber 33 or 42) which flexes in the outward direction from the chamber. Pressure lands 25, 26 and 27 supply fluid pressure from sources P1 and P2 to fluid passages 35, 36 and 37. Fluid passage 35 supplies pressure P2 to the bellows chamber 33 connected to that passage, and fluid passage 36 supplies pressure P2 to the bellows chamber 33 connected to that passage. Fluid line 37 supplies pressure P1 to an inner bellows chamber 42 formed between the inner bellows 31 and a projecting member of the outer member 22. An outer bellows or bearing chamber 41 is formed between the outer bellows 32 and the side of the casing 26. Chambers 41 as well as chamber 43 is basically at atmospheric pressure. The inner bellows 31 and the outer bellows 32 are flexible such that the sides can flex inward depending upon the pressure (P1-P2) difference between the bellows chamber 33 and the inner bellows chamber 42.

The first pressure P1 source supplies pressure to the pressure land 25 and a second pressure source P2 supplies pressure to the pressure lands 26 and 27. The second pressure source P2 will thus control the pressure acting within the bellows chambers 33. The pressure passage 37 opens into the inner bellows chamber 42. The pressure sources P1 and P2 can be from the working fluid such as the fluid being pumped if the turbomachine is a pump, or from a separate pressure source that is not the working fluid. Control valves 51 and 52 located between the pressure source and the lands (25, 26, 27) can be used to regulate the pressure to the chambers 33 and 42.

The damping fluid in the film damper space 23 is pressurized by application of pressure fluid from the first pressure source P1 in pressure land 25. Application of second pressure P2 to the pressure lands 26 and 27 in the bellows chamber 33 formed between the inner bellows 31 and the outer bellows 32 acts to control the spring rate of the support system and can be changed rapidly and accurately. The spring rate of the system is changed by varying the pressure ratio P1/P2 between the bellows chamber 33 connected to the pressure land 26 and 27 and the low pressure in the bearing chamber 41. Since the pressure in the bearing chamber 41 does not change much, an increase in the second pressure P2 will increase the pressure ratio and change the spring rate.

Because the squeeze film damper fluid is separated from the bellows fluid and the secondary fluid that would leak past the labyrinth seal 51, no leakage of damper fluid will occur. By separating the damper fluid from the secondary fluid, the bellows 31 and 32 will allow for the same performance as in the Prior Art squeeze film damper but with no leakage. Reducing the secondary flow reduces parasitic losses and therefore increases volumetric efficiency.

In operation, when the rotor shaft 12 is not rotating and pressure is applied to the squeeze film damper, the inner bellows 31 will act to center the bearing because of the spring rate of the material and shape of the bellows 31 and 32. When the rotor shaft 12 begins to rotate and fluid pressure builds up (in the case of a turbopump), the inner annuli of the bellows will be provided with a pressure from the turbopump volute discharge or any other controllable pressure source either internal or external to the pumps. Thus, the squeeze film damper fluid pressure will increase. By varying the pressure in the bellows chamber 33 supplied by the first pressure P1 through the pressure land 25, the rigid body vibration modes of the rotor can be controlled.

The first and second pressures P1 and P2 applied to the lands 25, 26 and 27 does not result in a fluid flow through the passages (35,36,37). The pressures are applied to fluid already inside the bellows chamber 33 or within the squeeze film damper chamber 23 and the inner bellows chamber 33. The regulating the pressures applied to the lands 25-27, the relative pressure difference between the bellows chamber 33 and the inner bellows chamber 42 varies, resulting in the flexing of the bellows and the squeeze film damper chamber 23 pressure level.

I claim the following:

1. A squeeze film damper for supporting a rotary bearing comprising:
   a squeeze film damper chamber supplied with a damping fluid from a first pressure source;
   a flexible chamber forming an enclosure for the squeeze film damper chamber, the flexible chamber being supplied with a separate pressure fluid from the squeeze film damper;
   the flexible chamber being formed from a flexible bellows which flexes inward toward the flexible chamber; and,
   pressure regulating means to vary the pressure ratio between the damper chamber and the flexible chamber such that the squeeze film damper stiffness varies.

2. The squeeze film damper of claim 1, and further comprising:
   the flexible chamber is an annular chamber sealed from the damping fluid of the squeeze film damper chamber.

3. The squeeze film damper of claim 2, and further comprising:
   the flexible annular chamber is a bellows chamber.

4. The squeeze film damper of claim 2, and further comprising:
   the squeeze film damper chamber is formed by a surface projecting from an outer member and an inner member supporting the bearing; and,
   the flexible bellows chamber is secured to the outer member and the inner member to form the sealed squeeze film damping chamber and the flexible chamber.

5. The squeeze film damper of claim 4, and further comprising:
   the outer member includes a first fluid passage to supply the squeeze film damper chamber with the damper pressure and a second fluid passage to supply the flexible chamber with a flexible chamber pressure.

6. The squeeze film damper of claim 1, and further comprising:
   the damper chamber is formed by a first flexible chamber on one side and a second flexible chamber on the opposite side from the damper chamber.

7. The squeeze film damper of claim 6, and further comprising:
   the first and the second flexible chambers are supplied by a common pressure source.

8. The squeeze film damper of claim 6, and further comprising:
   the first and second flexible chambers form a sealed damper chamber such that the damper fluid and the flexible chamber fluid do not mix.

9. The squeeze film damper of claim 6, and further comprising:
   a first pressure regulating means to regulate the pressure applied to the damper chamber; and, a second pressure regulating means to regulate the pressure applied to the first and second flexible chambers.

10. The squeeze film damper of claim 6, and further comprising:
the first and second flexible chambers are annular chambers extending around the rotational axis of the bearing.

11. The squeeze film damper of claim 1, and further comprising:
the bellows chambers is formed of an upper part and a lower part, and the joint between the two parts flexes.

12. A squeeze film damper assembly for use in damping a rotary bearing, the assembly comprising:
an outer member having a projection that forms a surface of the damper chamber, the outer member having an outer surface for support in a casing;
an inner member having an outer surface forming the damper chamber, the inner member having an inner surface to support an outer race of the bearing;
a first flexible chamber secured to the outer member and the inner member on one side of the damper chamber;
a second flexible member secured to the outer member and the inner member on the opposite side of the damper chamber from the first flexible chamber;
the damper chamber being fluidly sealed between the inner and outer members and the two flexible chambers;
the outer member having fluid passage means to fluidly connect the damper chamber with a first pressure source and the two flexible chambers to a second pressure source such that the stiffness of the squeeze film damper can be varied; and,
the first and second flexible chambers are formed to flex inward toward the damper chamber.

13. The squeeze film damper assembly of claim 12, and further comprising:
the flexible chambers are annular flexible chambers centered on the rotational axis of the bearing.

14. The squeeze film damper assembly of claim 13, and further comprising:
the annular flexible chambers are bellows chambers.

15. The squeeze film damper assembly of claim 12, and further comprising:
the flexible chambers seal the damper chamber from the bearing.

16. The squeeze film damper assembly of claim 15, and further comprising:
the damper chamber fluid does not mix with the flexible chamber fluid.

17. The squeeze film damper of claim 12, and further comprising:
the bellows chambers is formed of an upper part and a lower part, and the joint between the two parts flexes.

* * * * *